United States Patent [19]

Otsuka et al.

[11] Patent Number: 5,736,096
[45] Date of Patent: Apr. 7, 1998

[54] APPARATUS FOR PURIFYING METAL

[75] Inventors: Ryotatsu Otsuka, Kawachinagano; Jin Zhang, Sakai; Takashi Tomita; Tohru Nunoi, both of Nara; Tomohiro Machida, Yao, all of Japan

[73] Assignees: Sharp Kabushiki Kaisha; Showa Aluminum Corp., both of Osaka, Japan

[21] Appl. No.: 691,320

[22] Filed: Aug. 2, 1996

[30]    Foreign Application Priority Data

Aug. 4, 1995  [JP]  Japan .................... 7-199877
Aug. 4, 1995  [JP]  Japan .................... 7-199878

[51] Int. Cl.[6] ........................................ C22B 7/04
[52] U.S. Cl. ............................ 266/205; 266/200
[58] Field of Search ........................ 266/200, 204, 266/205, 227

[56]         References Cited

U.S. PATENT DOCUMENTS

| 3,861,660 | 1/1975 | Ammann | 266/205 |
| 4,747,906 | 5/1988 | Shingu | 156/624 |
| 4,948,102 | 8/1990 | Otsuka et al. | 266/205 |

FOREIGN PATENT DOCUMENTS 10 38 287   2/1959  Germany .
57-105232   6/1982  Japan .
60-190531   9/1985  Japan .
63-45112    2/1988  Japan .

*Primary Examiner*—Scott Kastler
*Attorney, Agent, or Firm*—Armstrong, Westerman, Hattori, McLeland & Naughton

[57]              ABSTRACT

A metal purifying apparatus comprises a closed melting furnace equipped with a heater, molten metal holding crucible disposed within the furnace, a vertical hollow rotary shaft penetrating through a top wall of the furnace, a packing sealing off a clearance in the shaft penetrating portion of the top wall around the shaft, rotary drive means for rotatingly driving the shaft, a hollow rotary cooling body fixedly provided at a lower end of the shaft and having an interior space communicating with an interior space of the shaft, and a cooling fluid supply source for supplying a cooling fluid to the interior of the cooling body. The rotary shaft has disposed therein a cooling fluid discharge pipe with a lower end positioned below the top wall of the furnace. An outer periphery of the discahrge pipe and an inner periphery of the shaft are spaced apart from each other and define a space portion providing a cooling fluid supply channel for passing therethrough the cooling fluid to be supplied from the source to the interior space of the cooling body. The discharge pipe has an interior providing a cooling fluid discharge channel for discharging therethrough the cooling fluid supplied to the interior of the cooling body.

8 Claims, 6 Drawing Sheets

APPARATUS FOR PURIFYING METAL

BACKGROUND OF THE INVENTION

The present invention relates to apparatus for purifying a metal containing eutectic impurities, such as aluminum or silicon, utilizing the principle of segregation solidification to prepare a metal of higher purity.

For example, an aluminum purifying apparatus is known which comprises a crucible, a vertical hollow rotary shaft, a hollow rotary cooling body fixedly provided at the lower end of the rotary shaft, a cooling fluid supply pipe disposed within the rotary shaft, and a hollow tubular cooling fluid discharge member disposed within the cooling body and communicating with the supply pipe, the discharge member being formed with a multiplicity of cooling fluid outlet ports in its peripheral wall (see JP-B-65415/1991). Although not disclosed in the publication, such a purifying apparatus is provided with an upwardly open melting furnace equipped with heating means and accommodating the crucible therein, and rotary drive means for rotatingly driving the hollow rotary shaft. The upper end of the rotary shaft and the upper end of the supply pipe are connected to a rotary joint. The upper end of the supply pipe is in communication with a cooling fluid inlet formed in the body of the rotary joint. The rotary joint has the fluid inlet only in its body and is, so to speak, of the single opening type. A partition is provided at a lengthwise intermediate portion of the rotary shaft, and the supply pipe hermetically extends through the partition. A cooling fluid outlet is formed in the peripheral wall of the rotary shaft at a position below the partition. Below the partition, the inner periphery of the rotary shaft and the outer periphery of the supply pipe define a space portion serving as a cooling fluid discharge channel. The apparatus is adapted to cause a metal of higher purity to crystallize out on the outer periphery of the cooling body by immersing the cooling body in a molten metal placed in the crucible and rotating the cooling body by rotating the rotary shaft by the drive means while supplying a cooling fluid to the interior of the discharge member through the supply pipe and discharging the fluid into the cooling body through the outlet ports of the discharge member. The cooling fluid forced out from the discharge member flows upward through the discharge channel and is released to the atmosphere from the outlet.

However, the purifying apparatus has the problem that the molten metal within the crucible becomes contaminated with dust in the atmosphere, failing to give a metal of a high purity, for example, of at least 99.9999 wt. % because the melting furnace is upwardly open.

Further for example, a silicon purifying apparatus is known which comprises a closed melting furnace equipped with heating means, a molten silicon holding crucible disposed within the melting furnace, a vertical hollow rotary shaft extending through a top wall of the furnace, a hollow rotary cooling body provided at the lower end of the rotary shaft integrally therewith, and a cooling fluid supply pipe disposed within the rotary shaft, the supply pipe having a peripheral wall portion positioned within the cooling body and formed with a multiplicity of cooling fluid outlet ports (see JP-A-45112/1988). Although not disclosed in the publication, such a purifying apparatus is provided with rotary drive means for rotatingly driving the rotary shaft. The upper end of the rotary shaft and the upper end of the supply pipe are connected to a rotary joint. The upper end of the supply pipe is in communication with a cooling fluid inlet formed in the body of the rotary joint. The rotary joint is also, so to speak, of the single opening type having the fluid inlet only in its body. The rotary shaft is provided, at a lengthwise intermediate portion thereof, with a partition positioned above the top wall of the melting furnace, and the supply pipe hermetically extends through the partition. The rotary shaft has a cooling fluid outlet formed in its peripheral wall and positioned below the partition but above the top wall of the melting furnace. Below the partition, the inner periphery of the rotary shaft and the outer periphery of the supply pipe define a space portion providing a cooling fluid discharge channel. With the melting furnace containing an inert gas atmosphere or vacuum to prevent oxidation of silicon, the cooling body as immersed in molten silicon placed in the crucible is rotated by rotating the rotary shaft by the drive means while a cooling fluid is being forced out from the outlet ports of the supply pipe into the cooling body, whereby silicon having a higher purity is crystallized on the outer periphery of the cooling body. The cooling fluid forced out from the outlet ports of the supply pipe into the cooling body flows up through the discharge channel and is released to the atmosphere from the outlet.

Although JP-A-45112/1988 discloses nothing about the seal device to be provided between the top wall of the melting furnace and the outer periphery of the hollow rotary shaft, it appears common practice to use a known packing as an oil seal for such a portion in view of the cost. However, the use of the packing involves the following problem. The cooling fluid forced out from the supply pipe outlet ports into the cooling body is heated to a temperature over 200° C. with the heat of the molten silicon in the crucible and flows up through the discharge channel. The packing provided between the furnace top wall and the outer periphery of the rotary shaft is therefore heated and damaged with the heat of the hot cooling fluid to become no longer serviceable as a seal within a short period of time.

SUMMARY OF THE INVENTION

An object of the present invention is to provide a metal purifying apparatus which is free of the foregoing problems.

The present invention provides a metal purifying apparatus which comprises a closed melting furnace equipped with heating means, a molten metal holding crucible disposed within the melting furnace, a vertical hollow rotary shaft penetrating through a top wall of the melting furnace, a packing sealing off a clearance around an outer periphery of the rotary shaft in a shaft penetrating portion of the top wall of the melting furnace, rotary drive means for rotatingly driving the rotary shaft, a hollow rotary cooling body fixedly provided at a lower end of the rotary shaft and having an interior space in communication with an interior space of the rotary shaft, and a cooling fluid supply source for supplying a cooling fluid to the interior of the cooling body, and wherein the cooling body is immersed in a molten metal placed in the crucible and rotated by rotating the rotary shaft by the drive means while the cooling fluid is being supplied to the interior of the cooling body from the supply source to crystallize a metal of higher purity on an outer periphery of the cooling body, the rotary shaft having disposed therein a cooling fluid discharge pipe with a lower end positioned below the top wall of the melting furnace, an outer periphery of the discharge pipe and an inner periphery of the rotary shaft being spaced apart from each other and defining a space portion providing a cooling fluid supply channel for passing therethrough the cooling fluid to be supplied from the supply source to the interior space of the cooling body, the cooling fluid discharge pipe having an interior providing a cooling fluid discharge channel for discharging therethrough the cooling fluid supplied to the interior of the cooling body.

With the apparatus described above, the cooling fluid supplied from the supply source flows downward through the supply channel into the hollow rotary cooling body, cooling the peripheral wall of the cooling body. The fluid is heated with the heat of the molten metal held in the crucible, then enters the discharge channel in the interior of the discharge pipe through the lower end thereof which is open, flows up the channel and is discharged. Accordingly, the packing provided around the outer periphery of the rotary shaft in the shaft penetrating portion of the top wall romaine free of the influence of the heat of the fluid heated to a high temperature, retaining its properties for a prolonged period of time. Furthermore, the melting furnace which is closed prevents the molten metal within the crucible from becoming contaminated with dust or the like in the atmosphere.

The metal purifying apparatus may be so designed that a single rotary joint has connected thereto an upper end of the rotary shaft and an upper end of the discharge pipe, the rotary joint comprising a vertical tubular body having a closed upper end and an open lower end and a vertical rotary pipe rotatably supported within the joint body, the rotary pipe having an upper end positioned below a lower surface of an upper end closing wall of the joint body and a lower end projecting downward beyond the joint body, the joint body having a cooling fluid inlet formed in a peripheral wall thereof and positioned above the rotary pipe and a cooling fluid outlet formed in the upper end closing wall thereof, the upper end of the rotary shaft being joined to the lower end of the rotary pipe, the upper end of the discharge pipe being connected to the cooling fluid outlet, an upper end of the cooling fluid supply channel and an upper end of the cooling fluid discharge channel communicating with the inlet and the outlet respectively.

The metal purifying apparatus may be so designed that the discharge pipe extends downward beyond the lower end of the rotary shaft and has its lower end positioned in an interior lower portion of the cooling body, and that a cooling fluid discharge member in the form of a tube having a bottom wall is attached to the lower end of the rotary shaft, the discharge member being positioned within the cooling body and spaced apart from an inner periphery of the cooling body and the outer periphery of the discharge pipe, the discharge member having a multiplicity of cooling fluid outlet ports formed in a peripheral wall thereof, the discharge pipe having its lower end rotatably fitted in a through hole formed in the bottom wall of the discharge member, the cooling fluid supply channel being in communication with a space portion defined by an inner surface of the peripheral wall of the discharge member and the outer periphery of the discharge pipe.

The cooling fluid flowing down the supply channel in this case enters the discharge member and is forced out from the outlet ports against the peripheral wall of the cooling body to cool the wall. The fluid is heated with the heat of the molten metal held in the crucible, then enters the discharge channel in the interior of the discharge pipe, flows up the channel and is discharged from the apparatus. Accordingly, the packing provided around the outer periphery of the rotary shaft in the shaft penetrating portion of the top wall also remains unaffected by the heat of the fluid heated to a high temperature, consequently retaining its properties over a prolonged period of time.

In the metal purifying apparatus wherein the lower end of the cooling fluid discharge pipe is positioned in the interior lower portion of the cooling body, and the cooling fluid discharge member is attached to the lower end of the rotary shaft as described above, the discharge member is preferably made of graphite or a ceramic.

In this case, the discharge pipe can be rotatably and hermetically fitted in the through hole formed in the bottom wall of the discharge member without providing a seal around the lower end of the discharge pipe in the through hole. This reduces the number of components.

The metal purifying apparatus may be so designed that the rotary shaft is provided at a lengthwise intermediate portion thereof with a partition dividing the Anterior space of the rotary shaft into an upper portion and a lower portion and positioned below the top wall of the melting furnace, the discharge pipe being disposed in the upper interior portion of the rotary shaft above the partition and having its lower end rotatably fitted in a through bore formed in the partition, the cooling fluid supply channel being provided in the upper portion above the partition, a cooling fluid discharge member being disposed in the lower interior portion of the rotary shaft below the partition and having an upper end fixed to the partition and a lower end positioned within the cooling body, the discharge member having a double-wall structure comprising inner and outer two tubes, a closure wall connecting a lower end of the inner tube to a lower end of the outer tube and closing a lower end of a space portion defined by the inner and outer tubes, the discharge member being provided with a multiplicity of cooling fluid outlet ports in a tube wall forming a lower portion of the outer tube and positioned within the cooling body, the cooling fluid supply channel communicating with the space portion defined by the inner and outer tubes via a through hole formed in the partition, the cooling fluid discharge channel communicating with an interior of the inner tube.

The cooling fluid flowing down the supply channel in this case passes through the through hole in the partition into the space portion defined by the inner and outer tubes of the discharge member, further flows down the space portion and is forced out from the outlet ports in the outer tube against the peripheral wall of the cooling body to cool the wall. The fluid is heated with the heat of the molten metal held in the crucible, then enters the inner tube of the discharge member, flows upward through the tube and through the discharge channel in the interior of the discharge pipe and is discharged from the apparatus. Accordingly, the packing provided around the outer periphery of the rotary shaft in the shaft penetrating portion of the top wall remains unaffected also in this case by the heat of the fluid heated to a high temperature, consequently retaining its properties over a prolonged period of time.

In the metal purifying apparatus wherein the rotary shaft has at a lengthwise intermediate portion thereof the partition dividing the interior space of the shaft into an upper portion and a lower portion and positioned below the hop wall of the melting furnace as described above, the outer tube of the discharge member may have an enlarged portion positioned within the cooling body and formed with the cooling fluid outlet ports.

This decreases the distance from the outlet ports to the peripheral wall of the cooling body, permitting the cooling fluid to cool the outer surface of the peripheral wall of the cooling body with an improved efficiency.

Further in the metal purifying apparatus wherein the rotary shaft has at a lengthwise intermediate portion thereof the partition dividing the interior space of the shaft into an upper portion and a lower portion and positioned below the top wall of the melting surface as stated above, the lower end of the discharge pipe may be fitted in the through bore formed in the partition of the rotary shaft, with a graphite or ceramic ring provided around the discharge pipe lower end in the bore.

The graphite or ceramic ring then functions as a seal between the outer periphery of the discharge pipe lower end and the bore-defining inner periphery of the partition, making it possible to fit the discharge pipe in the partition through bore rotatably and hermetically. This obviates the need for an additional seal to result in a reduction in the number of components.

In the metal purifying apparatus described, the discharge pipe may extend downward beyond the lower end of the rotary shaft and have its lower end positioned in an interior lower portion of the cooling body, the discharge pipe having an enlarged portion positioned within the cooling body.

In this case, the portion for the cooling fluid to flow through upon entering the cooling body has a decreased cross sectional area, causing the fluid to flow through the portion at an increased velocity and consequently permitting the fluid to cool the outer periphery of the cooling body with an improved efficiency.

The present invention will be described below in greater detail with reference to the accompanying drawings.

DESCRIPTION OF THE PREFERRED EMBODIMENTS

Figure 1:
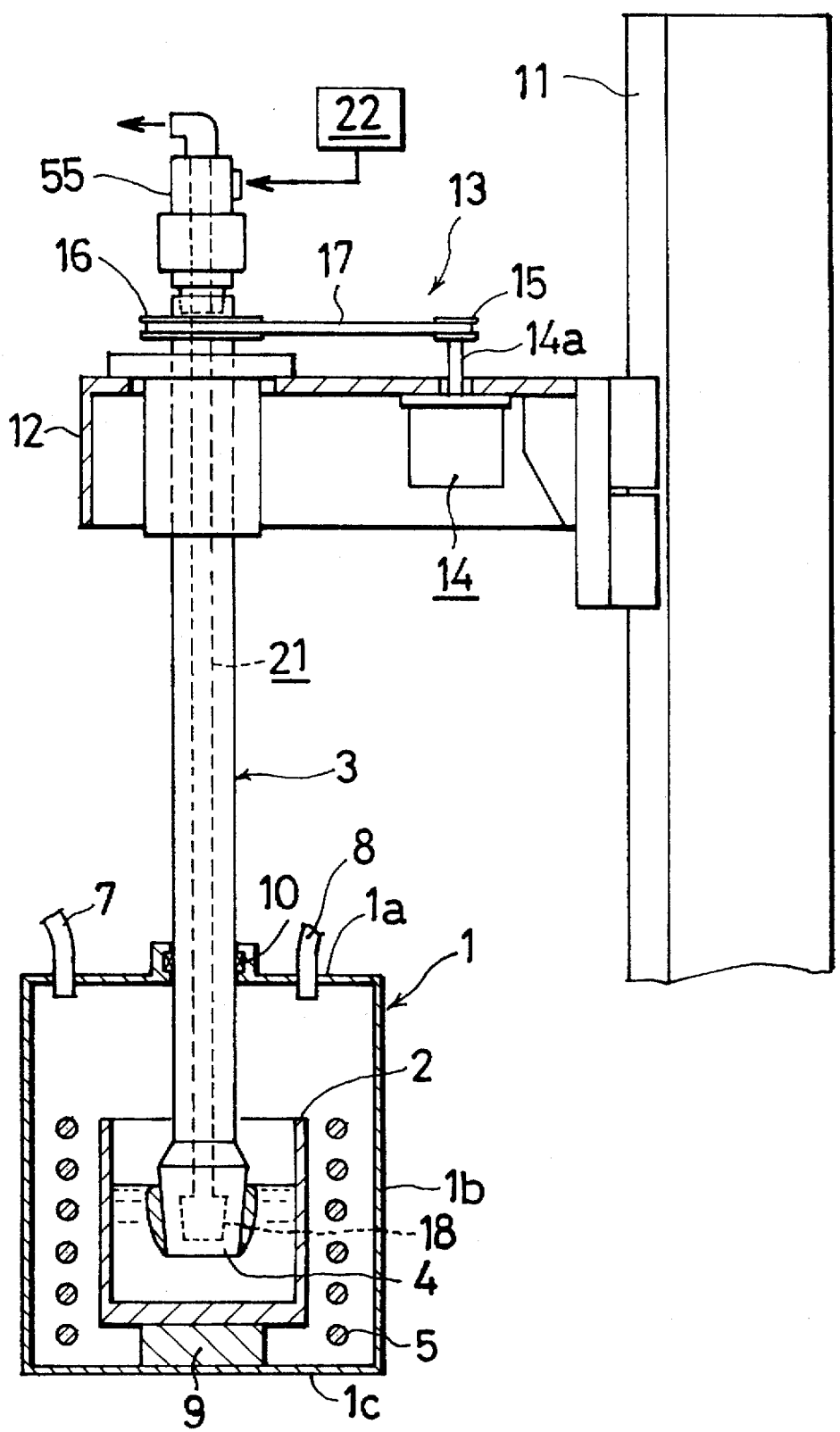
FIG. 1 is a front view partly broken away and showing the overall construction of a first embodiment of apparatus of the invention.

Throughout the drawings, like articles and like parts are designated by like reference numerals or symbols.

The embodiments to be described below are purifying apparatus of the invention as adapted to prepare silicon having a high purity of at least 99.9 wt. % by purifying crude silicon.

Figure 2:
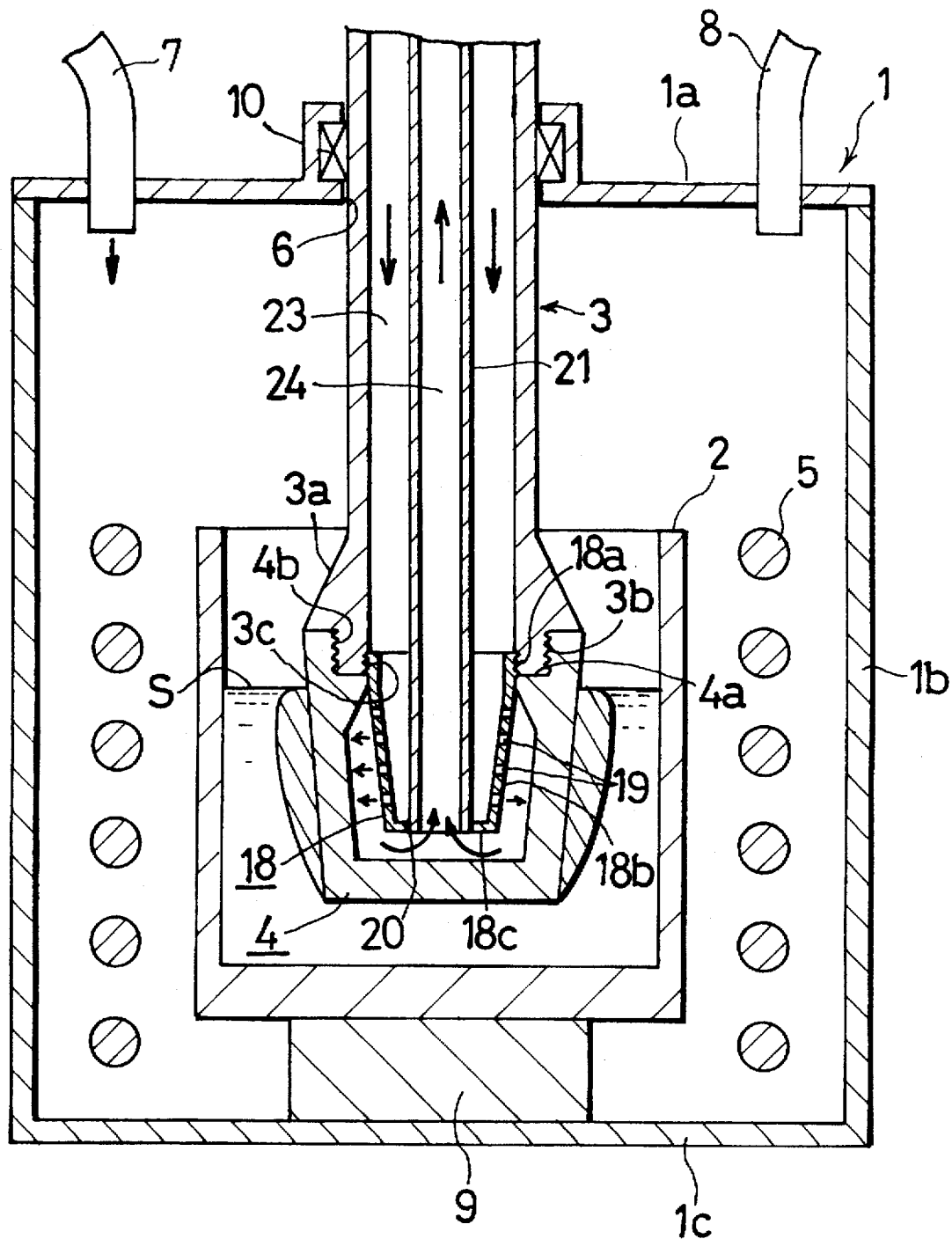
FIG. 2 is an enlarged view in vertical section showing the construction of the lower portion of the first embodiment of the invention.
Figure 3:
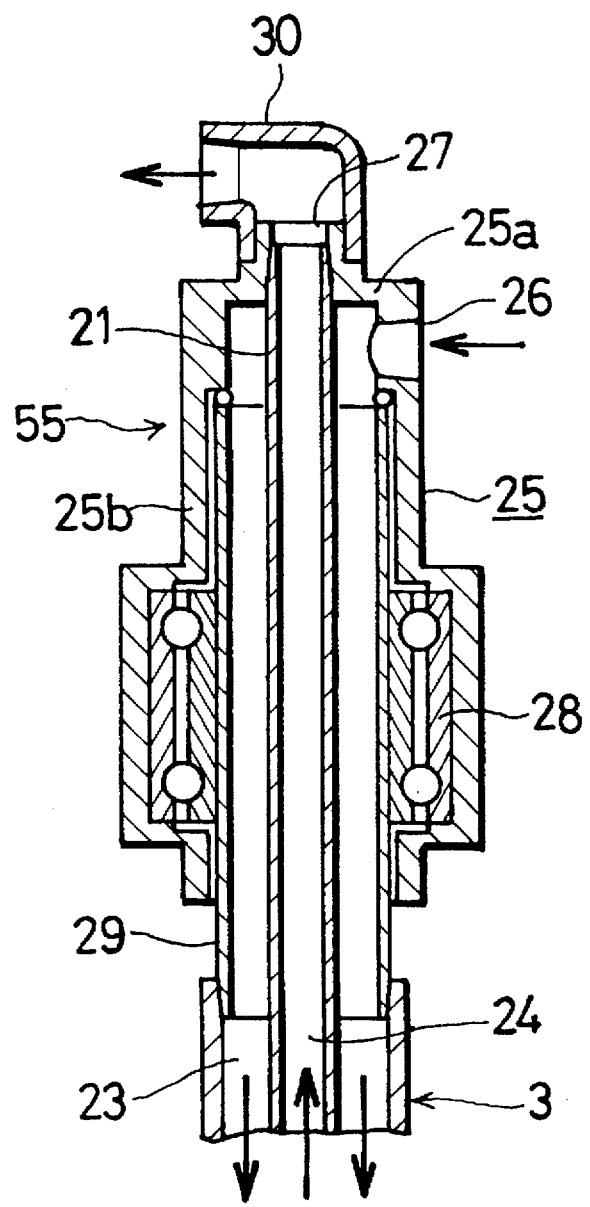
FIG. 3 is an enlarged view in vertical section showing the construction of the upper portion of the first embodiment of the invention.

FIG. 1 shows the overall construction of first embodiment of metal purifying apparatus of the invention, and FIGS. 2 and 3 are fragmentary views showing the embodiment in greater detail.

With reference to FIGS. 1 and 2, the metal purifying apparatus comprises a closed melting furnace 1, a molten silicon holding crucible 2 disposed within the furnace 1, a vertical hollow rotary shaft 3 extending through a top wall 1a of the furnace 1, and a hollow rotary cooling body 4 fixedly provided at the lower end of the rotary shaft 3 and having an interior space in communication with the interior space of the hollow rotary shaft 3.

The melting furnace 1 is made of a refractory material and has a peripheral wall 1b, along the inner periphery of which heater (heating means) 5 is disposed. The top wall 1a of the furnace 1 is removable and centrally formed with a through hole 6. An inert gas supply pipe 7 for supplying an insert gas, such as nitrogen gas or argon gas, to the interior of the furnace 1 and a pipe 8 for evacuating the furnace 1 extend through and are attached to the top wall 1a of the furnace 1.

The crucible 2 is made of a substance, such as graphite or alumina, which is less likely to react with silicon and to contaminate molten silicon. The crucible 2 rests on a refractory support 9 placed on the bottom wall 1c of the melting furnace 1.

The hollow rotary shaft 3 is made, for example, of graphite and extends through the hole 6 in the top wall 1a. A clearance in the hole 6 around the shaft 3 is sealed off by a packing 10 which is prepared, for example, from a synthetic rubber for use in oil seals. The shaft 3 has a flare portion 3a a small distance above its lower end, and an externally threaded portion 3b below the flare portion 3a. The shaft 3 further has an internally threaded portion 3c at the lower end. The rotary shaft 3 is rotatably supported by an armlike holder 12 with an unillustrated bearing provided therebetween, at a position above the furnace 1. The holder 12 is mounted on a fixed member 11 and movable upward and downward relative to the member 11. The shaft 3 is rotatable by rotary drive means 13, which comprises an electric motor 14 mounted on the holder 12 and directed upward, a pulley 15 fixedly mounted on the shaft 14a of the motor 14, a pulley 16 fixedly mounted on the rotary shaft 3, and a belt 17 reeved around the pulleys 15, 16.

The cooling body 4 is in the form of a tube having a bottom and tapered toward the bottom. The cooling body 4 is made of a material, such as silicon nitride or graphite, which has good thermal conductivity and which is nonreactive with and will not contaminate molten silicon. The inner periphery of the cooling body 4 is formed with an annular stepped portion 4a over the entire circumference at a position a small distance below the upper end of the body, and an internally threaded portion 4b above the stepped portion 4a. The externally threaded portion 3b of the rotary shaft 3 is screwed in the internally threaded portion 4b of the cooling body 4, whereby the cooling body 4 is fixed to the shaft 3. The outside diameter of the body upper end is approximately equal to the diameter of the greater end of the flare portion 3a of the shaft 3. The lower end face of the shaft 3 bears on the stepped portion 4a of the body 4, and the upper end face of the body 4 is in contact with the lower end face of flare portion 3a of the shaft 3.

A cooling fluid discharge member 18 in the form of a tube having a bottom and tapered toward its bottom wall 18c is attached to the lower end of the rotary shaft 3 so as to be positioned within the cooling body 4 and to be spaced apart from the inner periphery of the body 4. The peripheral wall 18b of the discharge member 18 is formed at its upper end with an externally threaded portion 18a, which is screwed in the internally threaded lower end portion 3c of the shaft 3, whereby the discharge member 18 is attached to the shaft 3. The discharge member 18 is made of graphite, a multiplicity of cooling fluid outlet ports 19 are formed in its peripheral wall 18b, and a through hole 20 is formed in the center of the bottom wall 18c.

Disposed inside the hollow rotary shaft 3 is a cooling fluid discharge pipe 21 having a lower end projecting downward beyond the lower end of the shaft 3 and positioned at the lower end of the discharge member 18 and an upper end projecting upward beyond the upper end of the shaft 3. The discharge pipe 21 has an outer periphery spaced apart from the inner periphery of the discharge member 18. The lower end of the discharge pipe 21 is rotatably and hermetically fitted in the through hole 20 in the bottom wall 18c of the discharge member 18. The inner periphery of the rotary shaft 3 and the outer periphery of the discharge pipe 21 define a space portion, which provides a cooling fluid supply channel 23 for passing therethrough the cooling fluid to be supplied from a cooling fluid supply source 22 to the interior of the cooling body 4. The interior of the discharge pipe 21 provides a cooling fluid discharge channel 24 for discharging therethrough the cooling fluid supplied to the interior of the cooling body 4.

The upper end of the rotary shaft 3 and the upper end of the discharge pipe 21 are connected to a single rotary joint 55. As seen in FIG. 3, the upper end of the supply channel 23 and the upper end of the discharge channel 24 are caused to communicate respectively with a cooling fluid inlet 26 and a cooling fluid outlet 27 formed in the body 25 of the joint 55. The rotary joint 55 comprises the body 25 which is in the form of a vertical tube and has a closed upper end and an open lower end, and a vertical rotary pipe 29 made, for example, of stainless steel and rotatably supported by a bearing 28 inside the body 25. Although not shown, the clearance between the inner periphery of the body 25 and the outer periphery of the rotary pipe 29 is sealed off by a movable face seal device such as a mechanical seal incorporating bellows. The rotary pipe 29 has an upper end positioned below the lower surface of an upper end closure wall 25a of the body 25 and a lower end projecting downward beyond the body 25. The pipe lower end projecting downward beyond the body 25 has an externally threaded portion (not shown), which is screwed in an internally threaded portion (not shown) at the upper end of the rotary shaft 3, whereby the upper end of the shaft 3 is joined to the lower end of the rotary pipe 29. The cooling fluid inlet 26 is formed in the peripheral wall 25b of the body 25 at a portion thereof above the rotary pipe 29, and the cooling fluid outlet 27 in the upper end closure wall 25a of the body 25. The supply source 22 is in communication with the inlet 26. The rotary joint 55 is, so to speak, of the double opening type having the inlet 26 and the outlet 27 in its body 75. The upper end of the discharge pipe 21 is fixedly inserted in the outlet 27. An elbow 30 communicating with the outlet 27 is attached to the upper end of the body 25 of the rotary joint 55. Although not shown, a cooling fluid delivery pipe is joined to the elbow 30.

Crude silicon is purified in the following manner using the purifying apparatus described.

With the crude silicon to be purified placed in the crucible 2 in advance, the interior of the melting furnace 1 is evacuated via the evacuating pipe 8. An inert gas is then supplied to the furnace 1 via the supply pipe 7 to fill the furnace 1 with an inert gas atmosphere. In this way, a complete inert gas atmosphere can be produced within the furnace 1. The crude silicon is heated by the heater 5 to prepare molten crude silicon S, which is held heated at a temperature above the solidification temperature. The molten crude silicon S is held in the inert gas atmosphere. Crude silicon prepared in the molten state S by other means may alternatively be placed into the crucible 2.

Subsequently, a cooling fluid is sent into the supply channel 23 from the source 22 through the inlet 26 formed in the body 25 of the rotary joint 55 and then through the body 25. The fluid flows down the channel 23 into the discharge member 18 and is forced out from the outlet ports 19 against the peripheral wall of the cooling body 4. Purified silicon having a high purity is caused to crystallize out on the outer periphery of the cooling body 4 based on the principle of segregation solidification by rotating the cooling body 4 by the drive means 13 through the rotary shaft 3 while applying the cooling fluid from the outlet ports 19 to the peripheral wall of the body 4 in this way. At this time, the discharge member 18 also rotates with the shaft 3 relative to the discharge pipe 21. The impurities released from the solidification interface into the liquid phase can be moved away from the interface and diffused through the entire liquid phase by the rotation of the cooling body 4 during the progress of solidification. Accordingly, solidification proceeds by being governed by a segregation coefficient approximate to an equilibrium segregation coefficient, permitting purified silicon of high purity to crystallize on the outer periphery of the cooling body 4 within a short period of time. The peripheral speed of the cooling body 4 in rotation is preferably 500 to 6,000 mm/sec, more preferably 500 to 4,000 mm/sec, because the melt will not be purified effectively if the speed is less than the lower limit and further because the solid phase of silicon encounters difficulty in depositing on the outer periphery of the cooling body 4 if the speed is over the upper limit.

The cooling fluid forced out against the peripheral wall of the cooling body 4 to cool the outer surface thereof and heated with the heat of the molten crude silicon S held within the crucible 2 enters the discharge channel 24 in the discharge pipe 21 through the open lower end of the pipe, flows upward through the channel 24, passes through the outlet 27 in the body 25 of the rotary joint 55 and is sent out into the delivery pipe via the elbow 30. Accordingly, the packing 10 provided in the through hole 6 of the furnace top wall 1a around the rotary shaft 3 remains unaffected by the heat of the cooling fluid heated to a high temperature.

Figure 4:
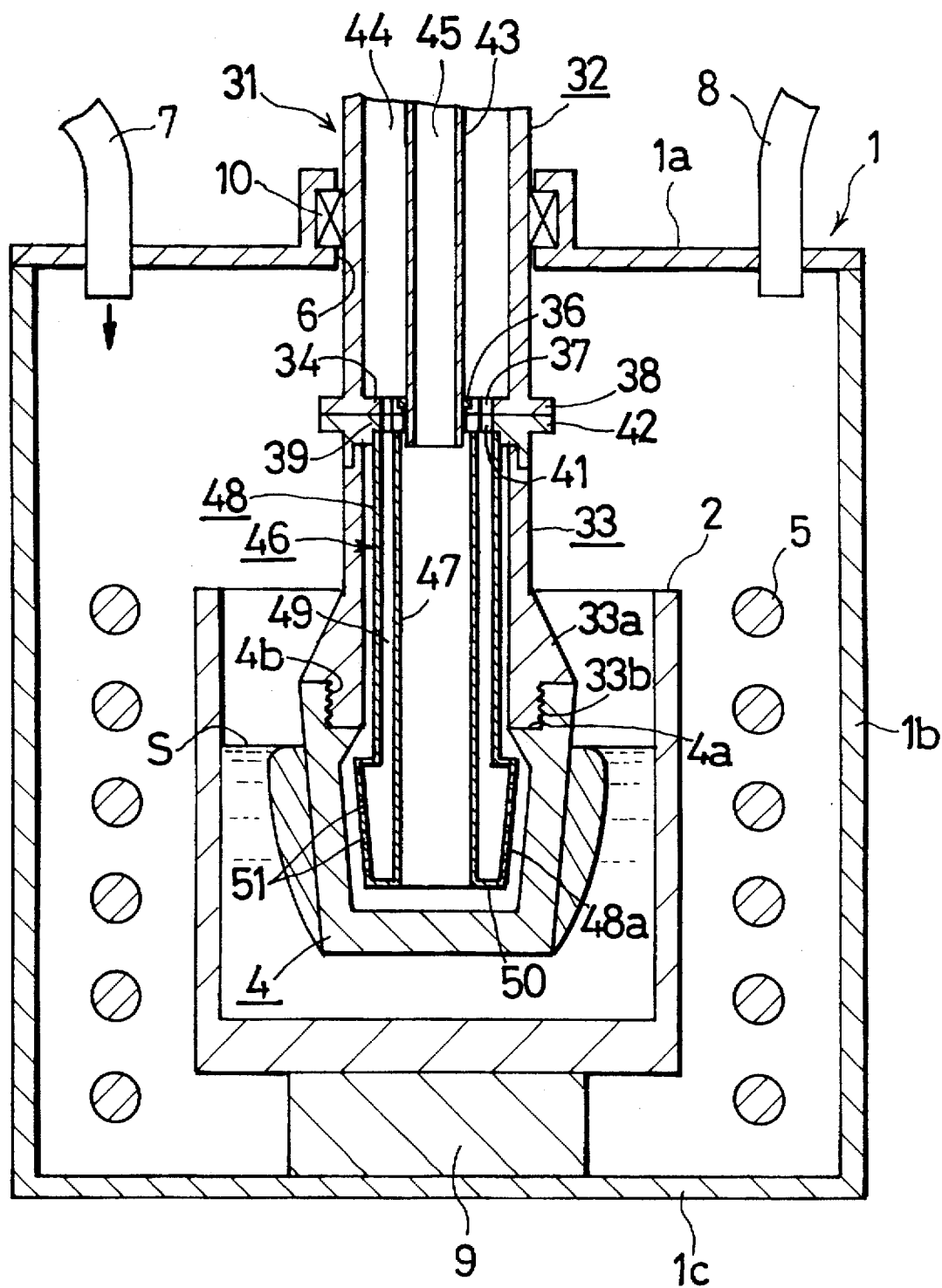
FIG. 4 is an enlarged view in vertical section showing the construction of the lower portion of a second embodiment of apparatus of the invention.
Figure 5:
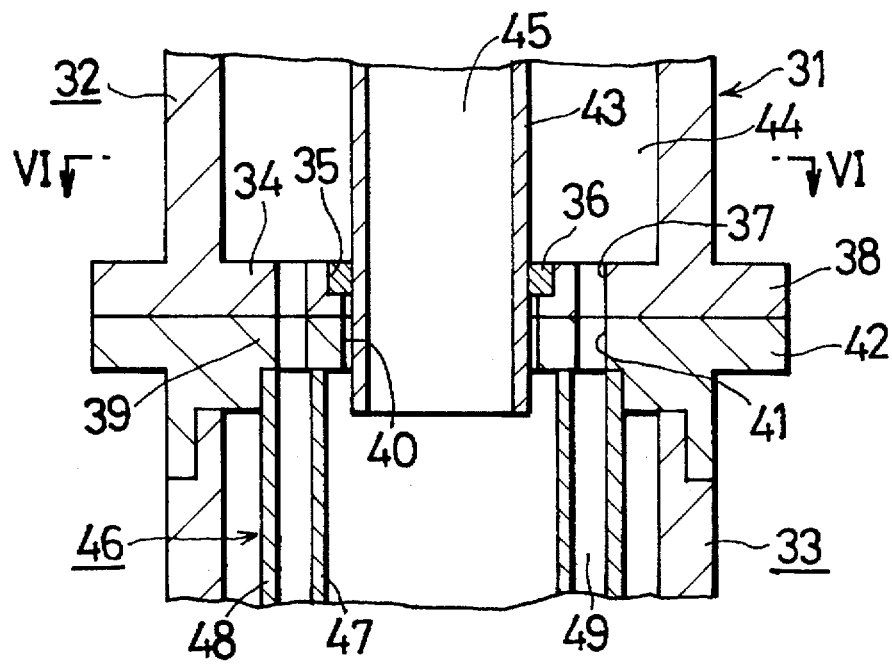
FIG. 5 is an enlarged fragmentary view of FIG. 4.
Figure 6:
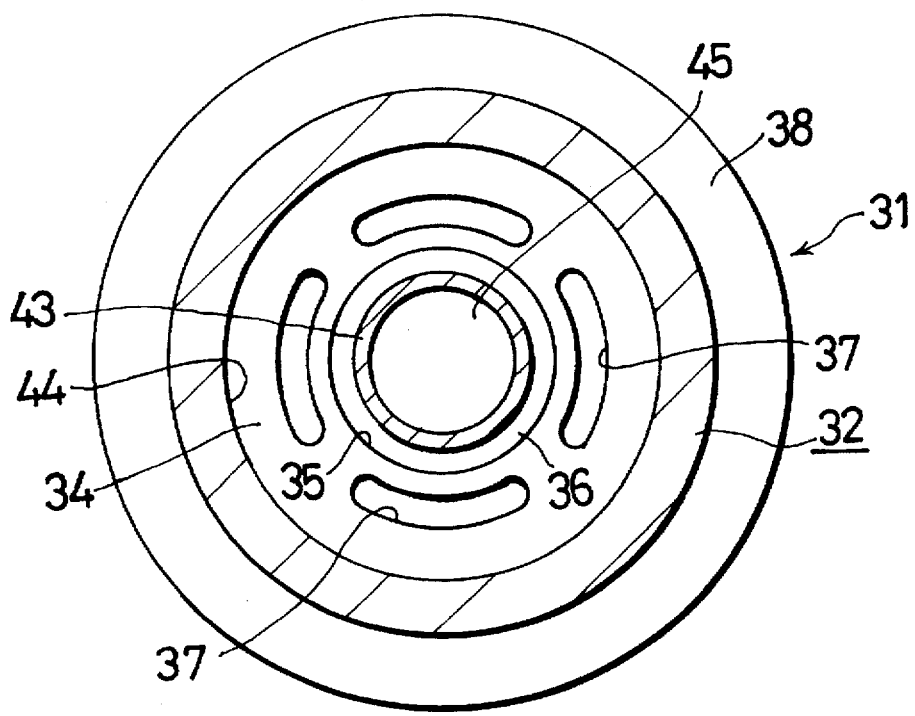
FIG. 6 is a view in section taken along the line VI—VI in FIG. 5.

FIGS. 4 to 6 show a second embodiment of apparatus of the invention.

This embodiment has a hollow rotary shaft 31 which comprises an upper component 32 extending through a hole 6 in the top wall 1a of a melting furnace 1 from above and having its lower end positioned within the furnace 1, and a lower component 33 fixed to the lower end of the upper component 32. The upper component 32 is made, for example, of stainless steel or like metal. The lower component 33 is made, for example, of graphite.

The upper component 32 has at its lower end an opening which is closed with a closure wall 34. The wall 34 has a through bore 35 in its center. A graphite ring 36 is fixedly fitted in the bore 35. The closure wall 34 is formed with a plurality of circular-arc slots 37 arranged on a circle around the through bore 35. The upper component 32 has an outer flange 38 integral with its lower end. The upper component 32 has an upper end which is joined to a rotary pipe 29 of a rotary joint 55 like the upper end of the shaft 3 of the first embodiment.

A closure member 39 made, for example, of stainless steel or like metal is fixedly fitted to the upper end of the lower component 33. The closure member 39 is centrally formed with a through bore 40 having a diameter greater than the inside diameter of the graphite ring 36. A plurality of circular-arc slots 41 communicating with the respective slots 37 of the upper component 32 and arranged on a circle are formed in the closure member 39 around the bore 40. The member 39 has an outer flange 42 integral with its outer periphery. This outer flange 42 is joined to the outer flange 38 of the upper component 32 with unillustrated fastening means such as bolts and nuts, whereby the lower component 33 is fastened to the lower end of the upper component 32. The closure wall 34 and the closure member 39 provide a petition at an intermediate portion of the rotary shaft 31, and the circular-arc slots 37, 41 formed in the wall 34 and the member 39 provide through holes in the partition. The lower component 33 has a lower end portion providing a flare portion 33a like the lower end of the shaft 3 of the first embodiment. The portion of the component 33 below the flare portion 33a is externally threaded as indicated at 33b. The externally threaded portion 33b of the lower component 33 is screwed in an internally threaded portion 4b of a hollow rotary cooling body 4, whereby the cooling body 4 fixed to the lower component 33.

A cooling fluid discharge pipe 43 disposed within the rotary shaft 31 is shorter than the discharge pipe 21 of the first embodiment, and has an upper end in communication with a cooling fluid outlet 27 of the rotary joint 55 like the upper end of the pipe 21 of the first embodiment and a lower end rotatably extending through the graphite ring 36 and inserted into the upper end of the lower component 33. The inner periphery of upper component 32 of the rotary shaft 31 and the outer periphery of the discharge pipe 43 define a space portion providing a cooling fluid supply channel 44. The upper end of the supply channel 44 and the upper end of a cooling fluid discharge channel 45 inside the discharge pipe 43 communicate respectively with a cooling fluid inlet 26 and the outlet 27 which are formed in the body 25 of the rotary joint 55.

A cooling fluid discharge member 46 having a lower portion positioned within the hollow rotary cooling body 4 is disposed inside the lower component 33. The discharge member 46 has a double-wall structure comprising an inner tube 47 and an outer tube 48. The inner and outer tubes 47, 48 define a space portion 49, the lower end of which is closed with a closure wall 50 connecting the lower end of the inner tube 47 to the lower end of the outer tube 48. The portion of outer tube 48 of the discharge member 46 positioned within the cooling body 4 provides a downwardly tapered enlarged portion 48a. The peripheral wall of the enlarged portion 48a has a multiplicity of cooling fluid outlet ports 51. The discharge member 46 has an upper end fixed to the closure member 39 at the upper end of the lower component 33. The supply channel 44 is in communication with the space portion 49 between the inner and outer tubes 47, 48 of the discharge member 46 through the circular-arc slots 37, 41 formed in the closure wall 34 and the closure member 39, The inner tube 47 of the discharge member 46 has an upper end surrounding the lower end of the discharge pipe 43, and the interior of the inner tube 47 is held in communication with the discharge channel 45.

The second embodiment has the same construction as the first embodiment except the above features. Throughout the drawings concerned, like parts are designated by like reference numerals or symbols.

Silicon is purified in the following manner using the purifying apparatus described.

As in the case of the first embodiment, molten crude silicon S in the crucible 2 is held heated by the heater 5 at a temperature over the solidification temperature.

Subsequently, a cooling fluid is sent into the supply channel 44 from the cooling fluid supply source 22 through the inlet 26 formed in the body 25 of the rotary joint 55 and then through the body 25. The fluid flows down the channel 44, passes through the slots 37, 41 in the closure wall 34 and the closure member 39 into the space portion 44, fur%her flows down the space portion 49 and is forced out against the peripheral wall of the cooling body 4 through the outlet ports 51 of enlarged portion 48a of outer tube 48 of the discharge member 46. In the same manner as in the first embodiment, purified silicon having a high purity is crystallized on the outer periphery of the cooling body 4.

The cooling fluid forced out against the peripheral wall of the cooling body 4 to cool the outer surface thereof and heated with the heat of the molten crude silicon S held in the crucible 2 enters the inner tube 47 of the discharge member 46 through the lower end opening of the tube, flows upward into the discharge channel 45 via the tube 47, further flows upward through the channel 45, passes through the outlet 27 in the body 25 of the rotary joint 55 and is sent out into the delivery pipe via the elbow 30. The packing 10 sealing a clearance in the hole 6 of top wall 1a of the furnace 1 around the rotary shaft 31 therefore remains unaffected also in this case by the heat of the cooling fluid heated to a high temperature.

Figure 7:
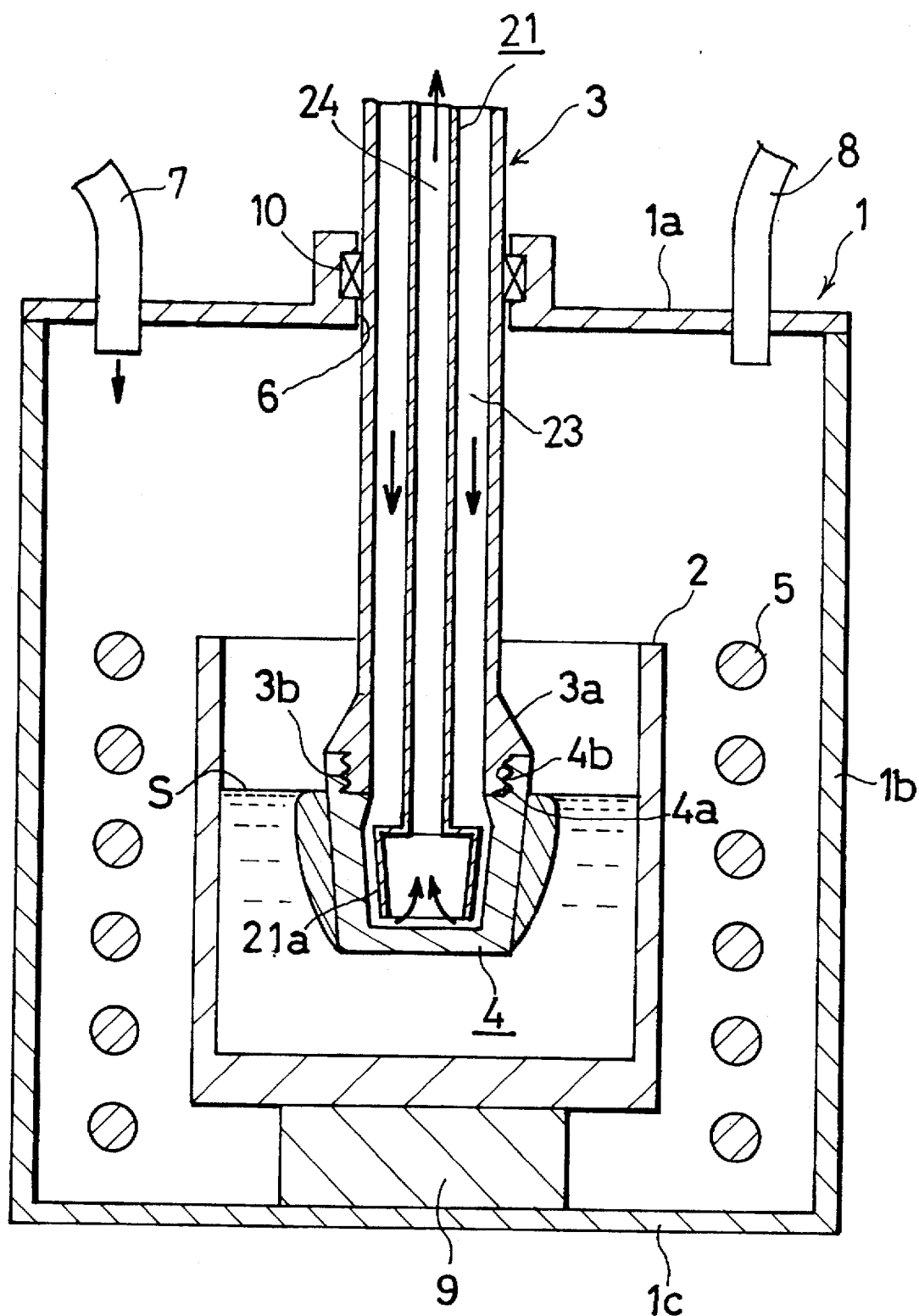
FIG. 7 is an enlarged view in vertical section showing the construction of the lower portion of a third embodiment of apparatus of the invention.

FIG. 7 shows a third embodiment of apparatus of the invention.

With this embodiment, a cooling fluid discharge pipe 21 disposed inside a hollow rotary shaft 3 extends downward beyond the lower end of the shaft 3 and has its lower end positioned in the lower end portion of a hollow rotary cooling body 4 inside thereof. The discharge pipe 21 has a lower portion positioned within the cooling body 4 and providing a downwardly tapered enlarged portion 21a. The portion between the peripheral wall of the cooling body 4 and the outer periphery of the enlarged portion 21a has a smaller cross sectional area than a cooling fluid supply channel 23. This gives an increased flow velocity to the cooling fluid for cooling the outer periphery of the cooling body 4 and produces turbulence, thereby causing the fluid to produce an improved heat transfer effect to cool the outer periphery of the body 4 more effectively. Experiments have revealed that if the clearance between the peripheral wall of the cooling body 4 and the outer periphery of the enlarged portion 21a is up to 5 mm, silicon of high purity can be caused to crystallize out on the outer periphery of the cooling body 4 economically without excessively increasing the flow rate of the fluid to be applied.

The third embodiment has the same construction as the first except the above feature. Throughout the drawings concerned, like parts are designated by like reference numerals or symbols.

Silicon is purified in the following manner using the purifying apparatus thus constructed.

As in the case of the first embodiment, molten crude silicon S in the crucible 2 is held heated by the heater 5 at a temperature above the solidification temperature.

Subsequently, a cooling fluid is sent into the supply channel 23 from the supply source 22 through the inlet 26 formed in the body 25 of the rotary joint 55 and then through the body 25. The fluid flows down the channel 23 into the cooling body 4 to cool the peripheral wall of the body 4. In the same manner as in the first embodiment, purified silicon of high purity is caused to crystallize out on the outer surface of peripheral wall of the cooling body 4.

The enlarged portion 21a provided at the lower portion of the discharge pipe 21 positioned within the cooling body 4 makes the region for the cooling fluid to flow through upon entering the body 4 smaller than the supply channel 23 in cross sectional area, consequently giving an increased flow velocity to the fluid in this region. The outer periphery of the cooling body 4 can therefore be cooled with the fluid with an improved efficiency. The fluid flowing into the cooling body 4 to cool the outer surface of the peripheral wall thereof and heated with the heat of the molten crude silicon S held in the crucible 2 enters the discharge channel 24 through the open lower end of the discharge pipe 21, flows up the channel 24, passes through the outlet 27 in the body 25 of the rotary joint 55 and is sent out into the delivery pipe via the elbow 30. The packing 10 sealing a clearance in the hole 6 of top wall 1a of the melting furnace 1 around the rotary shaft 3 therefore remains unaffected also in this case by the heat of the cooling fluid heated to a high temperature.

Although the melting furnace 1 is adapted to contain an inert gas atmosophere according to the foregoing three embodiments, the atmosphere may be replaced by a vacuum. In this case, the inert gas supply pipe 7 is removed from the top wall of the furnace 1, or replaced by an evacuating pipe fixedly inserted through the top wall so as to evacuate the furnace with use of the two evacuating pipes.

Although the purifying apparatus of the invention is used for purifying silicon in the case of the foregoing three embodiments, the apparatus is usable also for purifying aluminum to prepare aluminum having a superhigh purity, for example, of 99.9999 wt. %.

What is claimed is:

1. A metal purifying apparatus comprising:

a closed melting furnace equipped with heating means;

a molten metal holding crucible disposed within said melting furnace;

a vertical hollow rotary shaft penetrating through a top wall of said melting furnace;

a packing sealing off a clearance around an outer periphery of said rotary shaft in a shaft penetrating portion of said top wall of said melting furnace;

rotary drive means for rotatingly driving said rotary shaft;

a hollow rotary cooling body which is fixedly provided at a lower end of said rotary shaft and which has a hollow interior space in communication with an interior space of said rotary shaft;

a cooling fluid supply source for supplying a cooling fluid to said hollow interior space of said cooling body; and wherein said cooling body is immersed in a molten metal placed in said crucible and rotated by rotating said rotary shaft by said drive means while said cooling fluid is being supplied to said hollow interior space of said cooling body from said supply source to crystallize a metal of higher purity on an outer periphery of said cooling body, said rotary shaft having disposed therein a cooling fluid discharge pipe with a top end positioned above said top wall of said melting furnace and a lower end positioned below said top wall of said melting furnace, an outer periphery of said discharge pipe and an inner periphery of said rotary shaft being spaced apart from each other to define said interior space in said rotary shaft which provides a cold cooling fluid supply channel for passing therethrough said cooling fluid to be supplied from said supply source to said hollow interior space of said cooling body, said cooling fluid discharge pipe having an interior providing a hot cooling fluid discharge channel for discharging therethrough a hot cooling fluid supplied to said interior of said cooling body and heated by heat from said molten metal.

2. The metal purifying apparatus as defined in claim 1, wherein a single rotary joint has connected thereto an upper end of said rotary shaft and an upper end of said discharge pipe, and said rotary joint comprises a vertical tubular body having a closed upper end and an open lower end and a vertical rotary pipe rotatably supported within a joint body, said rotary pipe having an upper end positioned below a lower surface of an upper end wall of said joint body and a lower end projecting downwardly beyond said joint body, said joint body having a cooling fluid inlet formed in a peripheral wall thereof and positioned above said rotary pipe, said upper end of said discharge pipe being connected to said cooling fluid outlet, an upper end of said cooling fluid supply channel and an upper end of said cooling fluid discharge channel communicating with said inlet and said outlet, respectively.

3. The metal purifying apparatus as defined in claim 1 or 2, wherein said discharge pipe extends downwardly beyond said lower end of said rotary shaft and has a lower end positioned in an interior lower portion of said cooling body, and a cooling fluid discharge member in the form of a tube having a bottom wall, is attached to said lower end of said rotary shaft, said discharge member being positioned within said cooling body and spaced apart from an inner periphery of said cooling body and said outer periphery of said discharge pipe, said discharge member having a multiplicity of cooling fluid outlet ports formed in said peripheral wall thereof, said discharge pipe having said lower end rotatably fitted in a through hole formed in said bottom wall of said discharge member, said cooling fluid supply channel being in communication with a space portion defined by an inner surface of said peripheral wall of said discharge member and said outer periphery of said discharge pipe.

4. The metal purifying apparatus as defined in claim 3, wherein said discharge member is made of any one of graphite and a ceramic.

5. The metal purifying apparatus as defined in any one of claim 1 or 2, wherein said rotary shaft is provided at a lengthwise intermediate portion thereof with a partition dividing said interior space of said rotary shaft into an upper portion and a lower portion and positioned below said top wall of said melting furnace, said discharge pipe being disposed in said upper interior portion of said rotary shaft above said partition and having said lower end rotatably fitted in a through bore formed in said partition, said cooling fluid supply channel being provided in said upper portion above said partition, a cooling fluid discharge member being disposed in said lower interior portion of said rotary shaft below said partition and a lower end positioned with said cooling body, said discharge member having a double-walled structure comprising inner and outer tubes, said discharge member being provided with a multiplicity of cooling fluid outlet ports in a tube wall forming a lower portion of said outer tube positioned with said cooling body, said cooling fluid supply channel communicating with said space portion defined by said inner and outer tubes via a through hole formed in said partition, said cooling fluid discharge channel communicating with an interior of said inner tube.

6. The metal purifying apparatus as defined in claim 5, wherein said outer tube of said discharge member has an enlarged portion positioned within said cooling body and formed with said cooling fluid outlet ports.

7. The metal purifying apparatus as defined in claim 5, wherein said lower end of said discharge pipe is fitted in said through bore formed in said partition of said rotary shaft, with any one of a graphite and a ceramic ring provided in said bore around said lower end of said discharge pipe.

8. The metal purifying apparatus as defined in any one of claim 1 or 2, wherein said discharge pipe extends downwardly beyond said lower end of said rotary shaft and has said lower end positioned in an interior lower portion of said cooling body, said discharge pipe having an enlarged portion positioned within said cooling body.

* * * * *